Feb. 20, 1945. W. F. TRIPPENSEE 2,369,694
EMBALMING APPARATUS
Filed Nov. 7, 1938 5 Sheets-Sheet 1

INVENTOR.
William T. Trippensee
BY
S. E. Thomas
ATTORNEY.

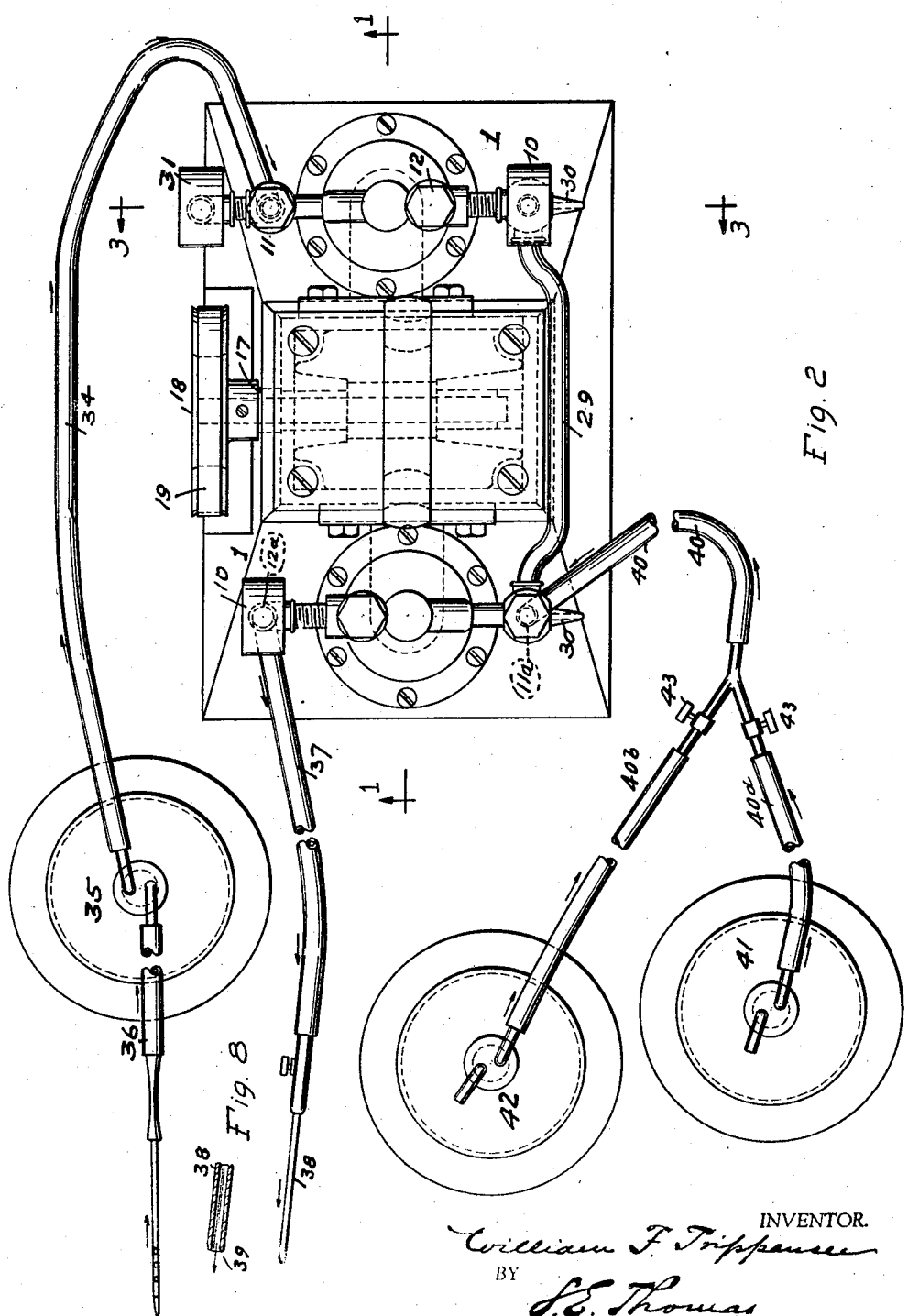

Feb. 20, 1945.  W. F. TRIPPENSEE  2,369,694
EMBALMING APPARATUS
Filed Nov. 7, 1938   5 Sheets-Sheet 3
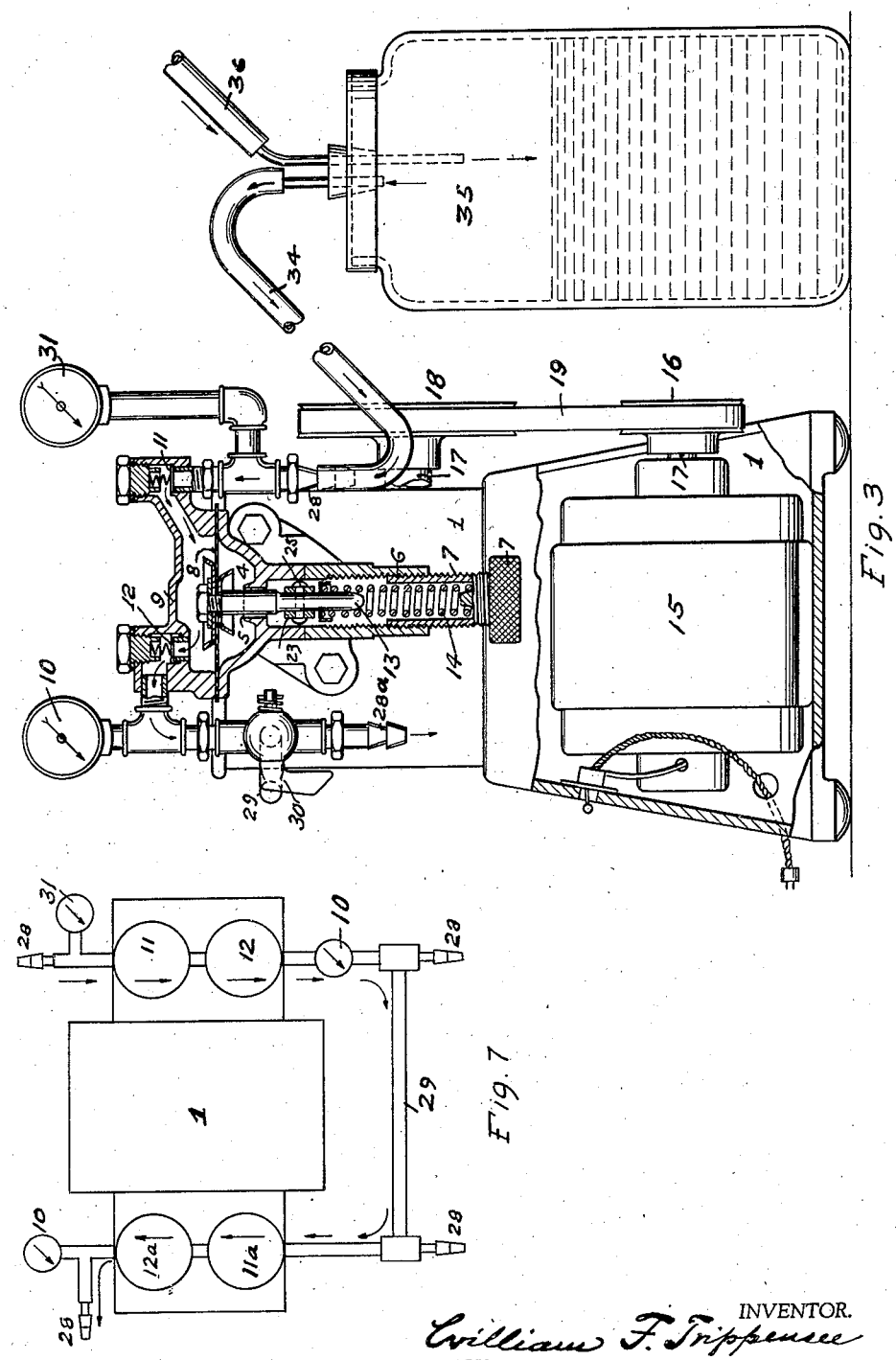
INVENTOR.
William F. Trippensee
BY
S. E. Thomas
ATTORNEY.

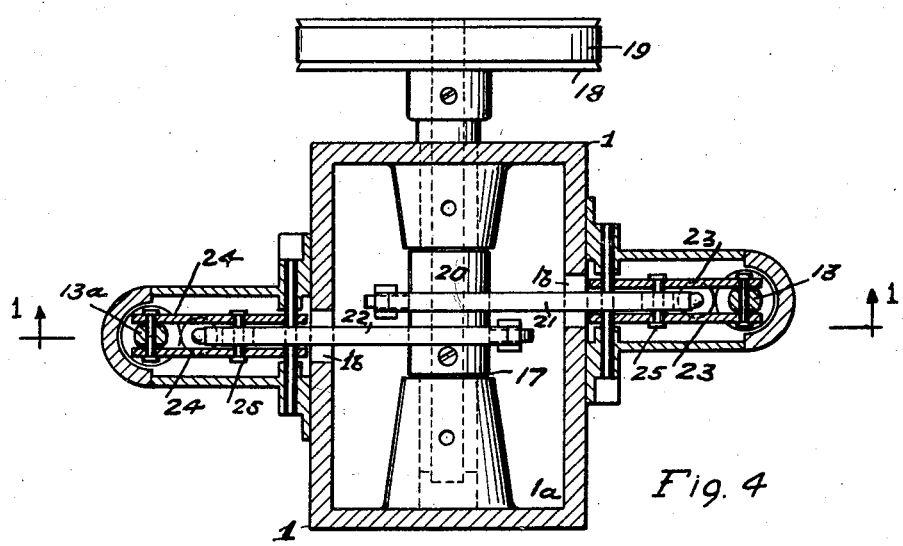

Feb. 20, 1945. W. F. TRIPPENSEE 2,369,694
EMBALMING APPARATUS
Filed Nov. 7, 1938  5 Sheets-Sheet 5

William F. Trippensee INVENTOR.
BY S. S. Thomas ATTORNEY.

Patented Feb. 20, 1945

2,369,694

UNITED STATES PATENT OFFICE 2,369,694

EMBALMING APPARATUS

William F. Trippensee, Detroit, Mich.

Application November 7, 1938, Serial No. 239,297

1 Claim. (Cl. 137—78)

My invention relates to embalming apparatus and has for its object an improved relation and coaction of the parts and one that shall secure a graduated impulsive action of the embalming fluid simulating the action of the heart in that the fluid will be delivered, for instance, into the vascular system of a cadaver in a series of spurts whereby to deliver hammer-like blows.

I secure this object in the apparatus illustrated in the accompanying drawings in which—

Figure 2 is a plan view of the apparatus, the operative connections being also indicated.

Figure 3 is a section on line 3—3 of Figure 2, to a reduced scale.

Figure 4 is a horizontal section on line 4—4, on Figure 1.

Figure 5 is a detail sectional elevation illustrating the action of the apparatus.

Figure 6 is a diagrammatic plan view illustrating one mode of operation.

Figure 7 is a view similar to Figure 6, indicating a second mode of operation.

Figure 8 is a detail sectional view of the end portion of the trocar used.

Figure 1:
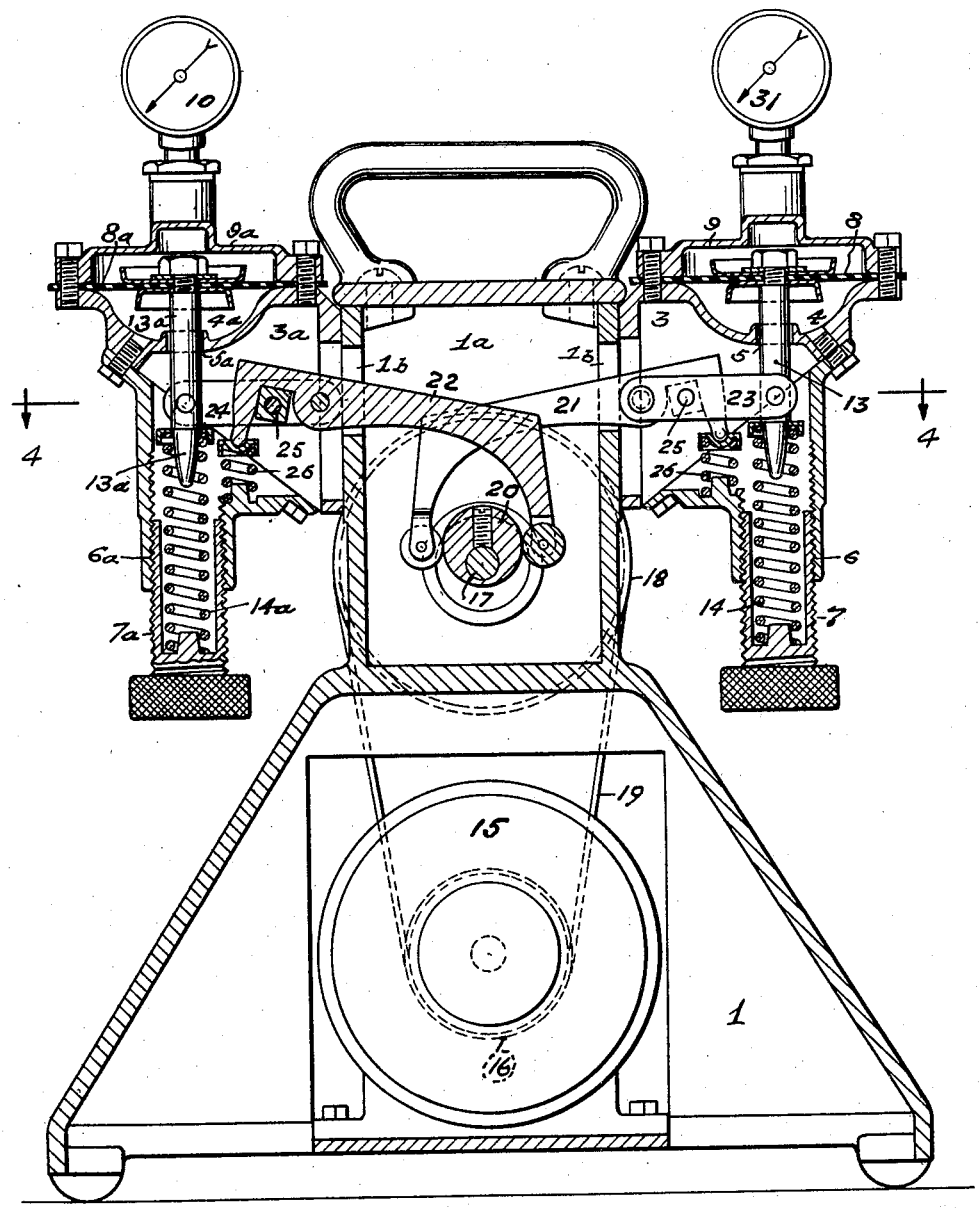
Figure 1 is a sectional elevation of an apparatus embodying my invention, the section being taken in the plane indicated by the line 1—1 on Figures 2 and 3.

Referring in the first place to the construction shown in Figures 1-4:

Numeral 1 indicates the casing as a whole, formed at its lower portion to provide a housing for the motor, and at its upper portion, an enclosure or chamber 1a, for the operating shaft and parts, which may contain oil for lubricating the parts. Numeral 1b—1b indicate opposite openings through the wall of the enclosure 1a. Numerals 3 and 3a denote hollow castings secured to opposite walls of the enclosure 1a, their interiors forming extensions of the openings 1b—1b. The upper surfaces of the castings 3 and 3a are in the plane of the upper surface of the casting 1 and are provided with cavites 4 and 4a, having coaxial openings 5 and 5a through their lower walls. Numerals 6 and 6a indicate vertical screw-threaded bores axially in line with the openings 5—5a and opening downward from castings 3 and 3a. Numerals 7 and 7a denote hollow screw-threaded plugs engaging and adjustable in the bores 6—6a, having milled heads at their lower ends.

Numerals 8—8a are flexible diaphragms covering the openings from the cavities 4 and 4a.

Numerals 9—9a are hollow castings forming covers for the openings from the cavities 4 and 4a, bolted to the castings 3—3a, so as to clamp the edges of the diaphragms 8 and 8a, between them and the edges of said cavities.

Numerals 10, 10 are pressure gages communicating with the interior of the castings 9—9a.

Numeral 11 (Figure 3) is an intake valve opening to the interior of the casting 9, and 12 is a discharge valve leading therefrom. The casting 9a is provided with entirely similar valves, but upon opposite sides of the casting.

Numerals 13—13a denote diaphragm pull rods extending downward from the centers of the diaphragms 8—8a and coaxially into the bores 6—6a.

Numerals 14—14a indicate compression springs engaging the plugs 7 and 7a at their lower ends and the diaphragm pull rods 13—13a at their upper ends.

The tension of said springs may be adjusted by screwing said plugs out or in. Numeral 15 designates an electric motor carried in the lower portion of the casing 1, having a shaft extending from said casing, and provided with a pulley 16 at its outer end. Numeral 17 indicates a shaft supported in bearings in the wall of the housing 1a, with one end of the shaft extending from the housing and fitted with a pulley 18. Numeral 19 indicates a belt passing around the pulleys 16 and 18. Numeral 20 denotes an eccentric cam on the shaft 16, within the enclosure 1a. Numerals 21 and 22 are cam-levers pivoted on the castings 3—3a extending through the openings 1b and provided with rollers at their inner ends engaging upon opposite sides of the cam 20.

Numerals 23 and 24 are pairs of links adapted, at their inner ends to oscillate about the same pivots as the cam-levers 21 and 22 and at their outer ends are pivoted to the diaphragm pull rods 13 and 13a. Numeral 25 indicates rods extending severally between the constituent links of each pair of links 23—24 in the lines of travel of the outer arm of the adjacent cam-levers 21 or 22. Numeral 26 indicates pressure springs interposed between the castings 3—3a and the outer ends of the cam-levers 21 and 22 and acting to yieldingly hold the inner ends of said levers against the periphery of the cams 20.

When the motor 15 is set in motion the shaft 17 and cam 20 are rotated oscillating the cam-levers 21 and 22, which on the downward motion of their outer arms engage cross rods 25 and press the outer ends of the links 23 and 24 downward which carry with them the diaphragm rods 13—13a, and which are returned by the resilience of the springs 14 and 14a, on the upward stroke of the outer arms of the cam-levers 21 and 22. The diaphragms 8—8a are carried with the diaphragm pull rods 13—13a, alternately contracting and expanding the chambers formed above them, drawing in fluid or air through the intake valves and expelling it from the discharge valves, thus forming a pump. Should the pressure above the diaphragm, 8—8a, be greater than the pressure of the springs 14—14a, the diaphragm would not rise with the arm of the cam-lever 21—22, but the arm of the lever would move out of contact with the cross-rod 25, as shown in Figure 5. Thus by adjusting the tension of a spring 14—14a by means of a plug 7—7a the pressure delivered can be accurately and certainly graduated.

There is a nozzle 28 formed to receive a rubber tube at the end of each of the inlet and outlet passages of said pumps. Numeral 29 denotes a pipe connecting an outlet passage of one pump with the intake passage of the other of said pumps, and 30—30 indicates three-way cocks for controlling the passage of fluid from and to said pumps.

A vacuum gage 31 communicates with the suction end of one of said pumps that may be connected to the intake of the other of said pumps.

Figure 9:
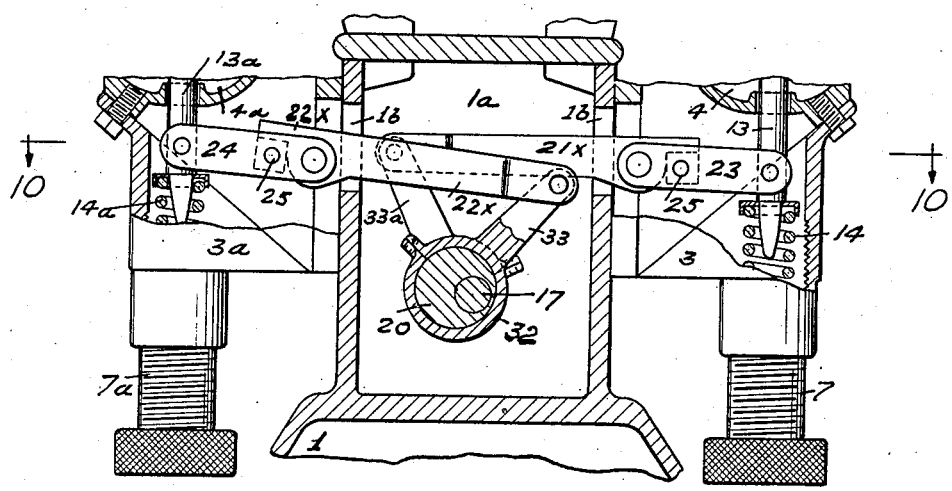
Figure 9 is a partial sectional elevation similar to Figure 1, showing a modified construction.
Figure 10:
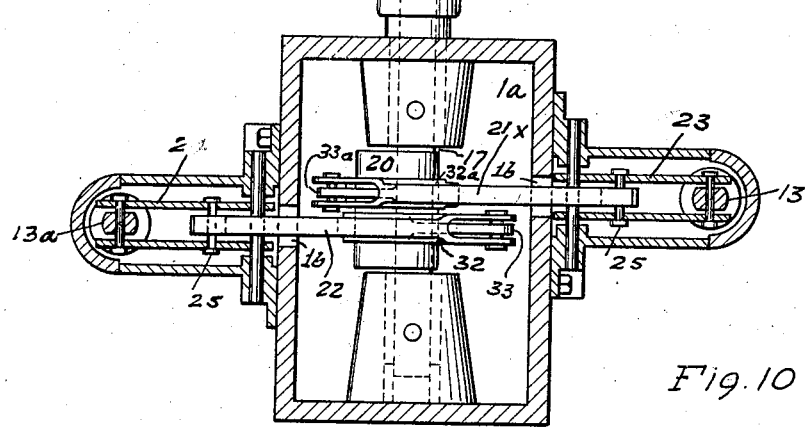
Figure 10 is a horizontal section taken on line 10—10 of Figure 9.
Figure 11:
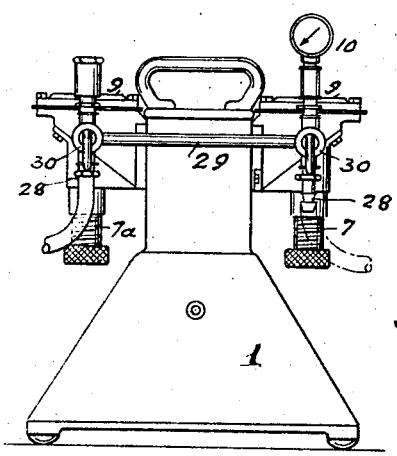
Figure 11 is an elevation to a reduced scale.

In the modification shown in Figures 9 and 10, the circular cam 20 is surrounded with eccentric straps 32 and 32a, from which extend eccentric rods 33 and 33a which pivotally engage the bifurcated inner ends of the levers 21x and 22x corresponding to the lever arms 21 and 22 of the construction shown in Figures 1 and 4.

The two pumps may be used singly or they may be used in series as hereinafter described.

In Figures 2 and 3 the port of the intake valve 11 of the right hand pump is connected by a rubber tubing 34 with a receiving jar 35, to create a vacuum therein to withdraw fluid from the cavities of a body through the trocar or tube 36, the operation being called "aspirating."

The discharge port of said pump is then open to the atmosphere as shown at 28a, see Figure 3.

In Figure 2 the left hand pump has a rubber tube 37 connected with the port of the discharge tube 12a which terminates in the injection needle 38 and which I prefer to have open at its end as shown at 39, see Figure 8.

Numeral 40 denotes a rubber tube connected with the port of the intake valve 11a, and this may be connected by branches 40a and 40b with supply receptacles 41 and 42 and each branch may be provided with a shut-off cock 43, so that the operator can employ the material in either receptacle at will.

The two pumps may be used simultaneously, one pump for injecting the embalming fluid into the body through the arterial system, thereby forcing the blood from the body through the veins by way of a drainage tube inserted in the veins, while the other pump is aspirating the cavities of the body—or the two pumps may be used to inject fluid into two bodies at the same time—or one pump may be shut off, without interfering with the operation of the other pump.

Should a greater pressure be required than is furnished by a single pump the cocks 30—30 are manipulated to close the outlet passage of the right hand pump to the outer air and the connection of the left hand pump with the intake passage at 11a to which the tube is attached, and to connect the port of the discharge valve 12 of the right hand pump with the port of the intake valve 11a of the left hand pump through the pipe 29. The pumps will then act in series to deliver the sum of the pressures of the pumps, in this case, the tube 40 must be connected to the port of valve 11, instead of 11a.

By the use of hydrostatic pressure as provided by the present invention the embalmer has at hand a more efficient method of circulating the embalming fluid throughout the arteries, capillaries, and veins of the body by an even continuous flow of low pressure pulsations, which may be below the normal heart pressure but which, in any event, is such as may be used without danger of rupturing the blood vessels. The pulsations developed by the diaphragm pumps are little hammer like blows that force the embalming fluid through congested areas in the arteries, capillaries, and veins of the body where the blood is thick and often congealed and are like the pulsations of the heart in life that forces the blood to remote parts of the body.

While the apparatus is also adapted for air the latter requires more pressure to do the same work with more danger of distensions and facial distortions—the "bane" of the embalmer. The apparatus is portable, quiet and economical in use and while designed particularly for embalming may be used by surgeons, dentists, or artists for use in connection with the air brush, or any other use where low pressure or vacuum may be applied, such as circulating liquids or transferring same from one container to another by either of three ways; vacuum, pressure, or forcing same direct through the pumps.

What I claim is:

Apparatus for use in anatomical injection and aspiration, comprising a unit including two pump members each having a suction port and a pressure port; means common to both pump members effective for continuous alternating actuation of each pump member; a conduit connecting the suction port of one pump member and the pressure port of the other pump member; valve regulated means connecting said pump members to an injecting liquid reservoir and to an aspirating receptacle whereby said apparatus may be selectively controlled so that one of said pump members may inject while the other aspirates, or so that both pump members may be used concurrently for injection on one body or on two separate bodies.

WILLIAM F. TRIPPENSEE.